April 17, 1951  H. J. SCHRADER  2,549,641
DISPLAY OF THREE-DIMENSIONAL INFORMATION
Filed Oct. 31, 1947  2 Sheets-Sheet 2

Inventor
Harold John Schrader
By J. L. Whittaker
Attorney

Patented Apr. 17, 1951

2,549,641

UNITED STATES PATENT OFFICE 2,549,641

DISPLAY OF THREE-DIMENSIONAL INFORMATION

Harold John Schrader, Haddonfield, N. J., assignor to Radio Corporation of America, a corporation of Delaware Application October 31, 1947, Serial No. 783,354

4 Claims. (Cl. 343—11)

This invention relates to improvements in instrument landing or ground approach systems for aircraft, wherein radar equipment at a ground station is used to obtain information substantially continuously as to the range, azimuth and elevation of an aircraft as it approaches for a landing. Radar apparatus has been designed particularly for this purpose, and is generally known as "Ground Control Approach" or GCA radar. In order to simplify the operation of such equipment, it is desirable to provide the azimuth, elevation, and range information all in a single visual display. A composite display, and means for producing it, are described and claimed in copending U. S. Patent application Serial No. 623,106, filed October 18, 1945 by Irving Wolff and Philip J. Herbst and entitled Instrument Landing System which issued January 18, 1949 as Patent No. 2,459,481. The present invention deals with improvements over that of Wolff and Herbst.

The principal object of this invention it to provide methods and means for producing a composite display like that described by Wolff and Herbst, wherein the component azimuth and elevation pictures are made initially on the screen of a single indicator tube, rather than being produced separately and mixed optically or electronically as in said Wolff et al. system.

Another object is to provide a system of the described type wherein the accuracy of indication of elevation increases with decreasing range of the aircraft from its point of landing.

A further object of the invention is to provide a system which is considerably simpler and consequently cheaper and more dependable than that of Wolff et al.

Figure 1:
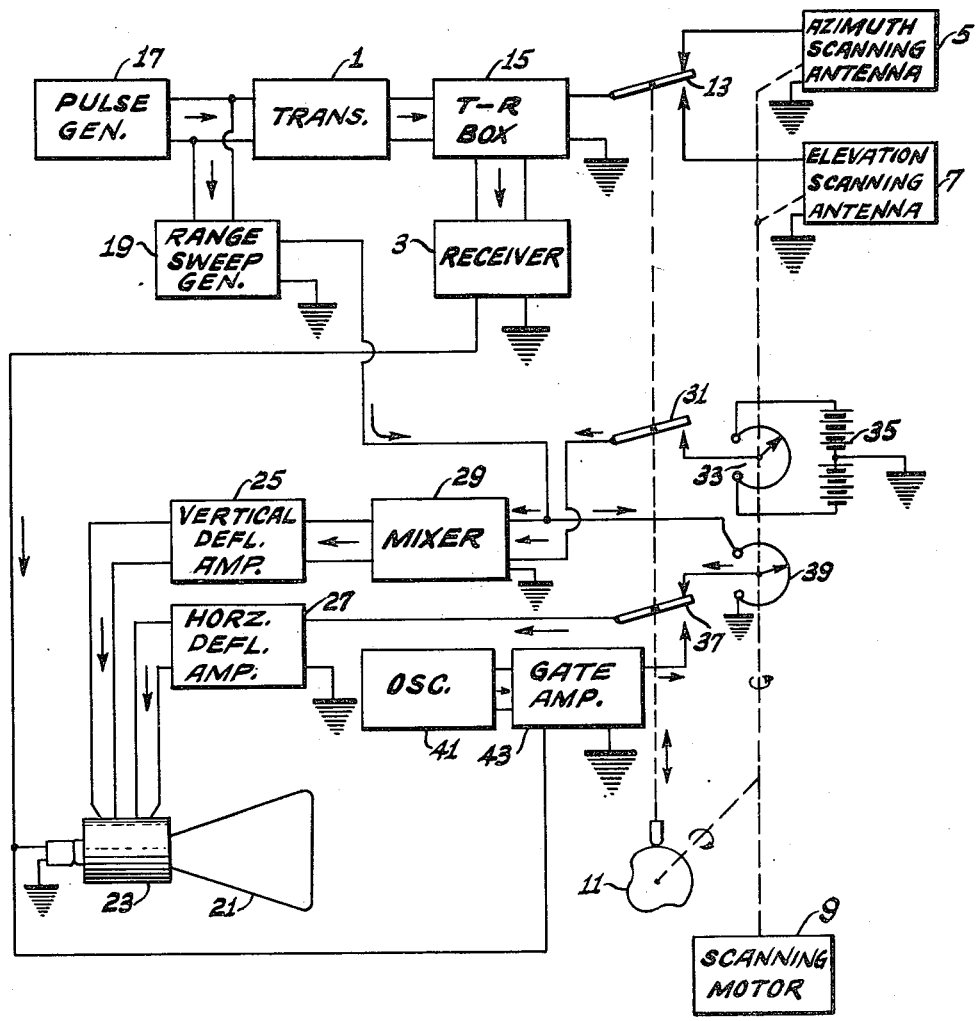
Figure 2:
Figure 3:
Figure 4:
Figure 5:
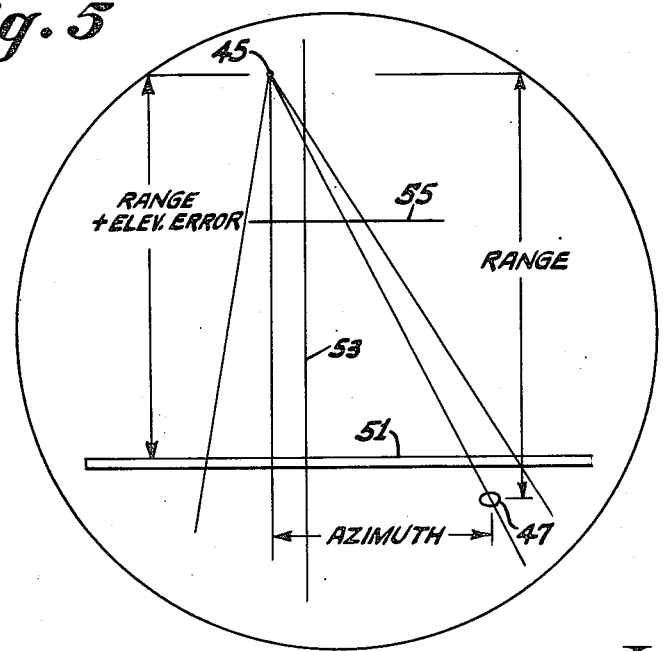

The invention will be described with reference to the accompanying drawings, wherein:

Figure 1 is a schematic block diagram of an embodiment of the instant invention, Figures 2, 3 and 4 are oscillograms of certain wave forms produced in the operation of the system of Figure 1, and Figure 5 shows a combined indication of azimuth, elevation and range as produced by the system of Figure 1.

The apparatus shown in Figure 1 is at a ground station located in the vicinity where aircraft are to be landed, preferably as near the "touchdown" or point of contact as is feasible without obstructing the glide path or interfering with aircraft maneuvers. The radar equipment includes a pulse transmitter 1, a receiver 3, and in the present example two antennas 5 and 7.

The antenna 5 has a fan shaped directive pattern, extremely narrow (perhaps a fraction of a degree wide) in azimuth, and relatively wide, say several degrees, in elevation. The antenna 7 has a similarly shaped pattern, narrow in elevation and wider in azimuth. The directive pattern of the antenna 5 can be oscillated throughout a sector of several degress in azimuth, and that of the antenna 7 can be oscillated similarly in elevation.

The antennas 5 and 7 may be structures of the type described in copending U. S. Patent application Serial No. 533,311, filed April 29, 1944 by Harley Iams, and entitled Radio Wave Devices which issued April 18, 1950 as Patent No. 2,504,333. However, any other known antenna devices providing fan like beams which can be oscillated in the manner described may be used. A motor 9 is coupled to the antennas 5 and 7 for driving them to scan cyclically through horizontal and vertical sectors respectively. The antennas are positioned so that the sectors which they scan include and are approximately centered on the glide path to be followed by an aircraft in landing.

The motor 9 drives a cam 11, which periodically actuates a switch 13 to bring the antennas 5 and 7 into operation alternately, each completing one scan during its respective period of operation. A T-R box 15 is included in the connections between the switch 13 and the transmitter and receiver, to enable each of the antennas to be used for both transmission and reception.

A pulse generator 17 modulates the transmitter 1, and also controls a range sweep generator 19, which is on oscillator providing an output of substantially sawtooth wave form. A wave from the generator 19 starts coincidentally with the production of each pulse by the pulse generator 17.

A cathode ray oscilloscope tube 21 is provided with a beam deflection yoke 23 connected to vertical and horizontal deflection signal amplifiers 25 and 27 respectively. The beam intensity control electrode of the tube 21 is connected to to the receiver 3. Conventional centering control means, not shown, are provided for adjustably biassing the deflection means to "position" the cathode ray beam to a predetermined spot on the luminescent screen of the tube 21.

Vertical deflection signals are supplied to the amplifier 25 through a mixer 29. The mixer 29 is connected directly to the range sweep generator 19, and through a switch 31 to an elevation sweep signal generator, which in the present example comprises a voltage divider 33 energized by a D.-C. source 35 and driven continuously by the scanning motor 9. The resistance-rotation characteristic of the voltage divider 33 is uniform, so that the elevation sweep signal is substantially a sawtooth shaped voltage wave whose period is the same as the antenna scanning period. The switch 31 is ganged with and operates in synchronism with the switch 13, connecting the voltage divider 33 to the mixer 29 only during the periods when the elevation scanning antenna 7 is in operation.

The horizontal deflection amplifier 27 is connected to a switch 37 which also operates in synchronism with the switch 13. During azimuth scanning, the amplifier 27 is connected to a voltage divider 39, which is supplied by the range sweep generator 19 and is driven continuously by the scanning motor 9. The resistance-rotation characteristic of the voltage divider 39 is uniform like that of the voltage divider 33. This the range sweep signal as applied to the amplifier 27 is modulated sawtooth fashion, the modulation period coinciding with the antenna sweep period.

An oscillator 41, operating at a high frequency compared to the pulse repetition frequency of the pulse generator 17, is coupled to the switch 37 through a "gate" amplifier 43. The amplifier 43 is essentially an ordinary video amplifier, except that it is normally biassed to cutoff. The receiver 3 is connected to the amplifier 43 so as to overcome the cutoff bias and allow the amplifier 43 to operate for a small fraction of the range sweep period in response to reception of a train of pulses by the receiver 3. The switch 37 connects the horizontal deflection amplifier 27 to the voltage divider 39 during azimuth scanning by the antenna 5, and to the gate amplifier 43 during elevation scanning by the antenna 7.

The operation of the above described system is as follows: With the switches 13, 31 and 37 in their upper positions as shown in the drawing, the antenna 5 is in use and the antenna 7 is idle. The pulse generator 17 modulates the transmitter 1, causing it to produce corresponding pulses of radio frequency energy; these pulses are radiated by the antenna 5 as it scans in azimuth. When an aircraft coming in for landing is struck by the beam of the antenna 5, it returns a signal to the ground station, either by reflection or by retransmission from a suitable "responder" beacon carried on the aircraft. In either case, the returned signal produces output from the receiver 3 in the form of a train of pulses like the pulses from the generator 17 but relayed with respect thereto by a time interval which corresponds to the distance or range of the aircraft from the ground station. This occurs only during the time that the craft is within the beam of the antenna 5.

Coincidentally with the transmission of each pulse, the range sweep generator starts a sawtooth wave which goes through the mixer 29 to the vertical deflection circuit of the cathode ray tube 21, and also through the voltage divider 39 to the horizontal deflection circuit of the tube 21. Figure 2 shows the pulses from the generator 17, and the solid line portion of Figure 3 represents the output of the range sweep generator 17. The cathode ray is normally biassed substantially off, so as to provide little or no visible light from the screen of the tube 21.

When the returned signal is received by the receiver 3, it overcomes the bias and allows the cathode ray to make a visible spot on the screen. The position of the spot vertically on the screen depends upon the instantaneous value of the vertical deflection signal at that time, and hence upon the delay between the transmitted and received pulses. Referring to Figure 5, the point 45 represents the "centered" or undeflected position of the cathode ray beam upon the screen of the tube 21. The vertical deflection voltage from the range sweep generator drives the beam downward in Figure 5. The spot produced by a received signal appears at 47 in Figure 5. Its distance vertically from the point 45 is proportional to the range of the aircraft.

The horizontal deflection circuit of the tube 21 is also energized by the range sweep generator 19, but to an extent which depends on the position of the voltage divider 39, and hence upon the azimuth of the beam of the antenna 5. Thus the displacement of the spot 47 (Figure 5) laterally of the screen of the tube 21 is proportional to azimuth. As the antenna 5 goes through its scan in azimuth, the cathode ray is deflected along successive radial lines from the point 45, scanning the screen of the tube 21 in synchronism with the scanning in azimuth of the antenna 5. Preferably the total angle scanned on the cathode ray tube is several times that scanned by the antenna 5, to afford maximum utilization of the available screen surface. This type of cathode ray scanning is called an "expanded sector" scan.

Upon completion of the azimuth scan, the switches 13, 31 and 37 move to their lower positions. The elevation scanning antenna 7 is substituted for the antenna 5, the output of the gate amplifier 43 is substituted for the modulated range sweep signal from the voltage divider 39, and the elevation sweep signal from the voltage divider 33 is applied to the mixer 29. Figure 4 represents the elevation sweep signal, which starts at some negative value at the beginning of the elevation scan, increasing in the positive direction to a maximum postive value at the end of the elevaton scan. The voltage is zero when the elevation of the beam of the antenna 7 is substantially the same as the elevation angle at which the aircraft should be if on the desired glide path. Figure 4 is not to scale with Figures 2 and 3; there are many more pulses and sawtooth waves during each elevation scan than are shown.

The elevation sweep signal is combined in the mixer 29 with the range sweep sawtooth, producing an output somewhat like the dash line portion of Figure 3. It is emphasized that this is not an exact representation of the output of the mixer 29, because the range sweep repetition frequency is in practice hundreds or even thousands of times the elevation sweep frequency. However, examination of Figure 3 will reveal clearly that the starting point of the range sweep during elevation scanning varies continuously during the elevation scan, being displaced from the normal by an amount which is greatest at the beginning and end of the scan, and is zero when the antenna beam elevation angle corresponds to the desired elevation of the aircraft.

The cathode ray spot is not deflected horizontally during the elevation scan until a return signal is received. At this time, the gate amplifier 43 opens and applies the output of the oscillator 41 to the horizontal deflection circuits. The bias on the beam of the cathode ray tube is overcome, and the resultant luminous spot is deflected rapidly back and forth, producing a horizontal line 51 (see Figure 5) on the screen.

The vertical distance of the line 51 from the spot deflection center 45 depends on the instantaneous magnitude of the sum of the range sweep signal and the elevation sweep signal, and thus is proportional to the range plus a quantity proportional to the difference between the actual elevation angle and the desired elevation angle to the aircraft. When the latter quantity is zero, the line 51 is at the same vertical distance from the point 45 as the spot 47 produced during the azimuth scan.

Owing to persistence of vision and persistence of illumination in the screen of the tube 21, both the spot 47 and the line 51 can be made to appear to be present continuously. A reference line 53 representing the runway may be drawn on the screen, or upon a transparent sheet placed over the screen. A further line 55 intersecting the line 53 at the point of contact may be similarly provided.

The deviation of the spot 47 to the left or right of the line 53 indicates corresponding deviation of the aircraft laterally from center line of the runway. Deviation of the spot 47 above or below the line 51 shows corresponding vertical deviation of the craft from the glide path. The vertical distance of the spot 47 from the line 55 is a measure of the distance of the craft from the "touchdown" point. As the aircraft approaches this point, both the line 51 and the spot 47 move upwards on the tube 21 toward the line 55, the spot 47 remaining at the intersection of the lines 51 and 53 as long as the aircraft is on the proper glide path.

The indication shown in Figure 5 is similar to that provided by the above mentioned Wolff and Herbst system, and may be utilized similarly by relaying to the aircraft on a television link, or may be used by a ground station operator to "talk down" a craft not equipped with television.

If the ground station antennas 5 and 7 are reasonably near the touchdown point, no serious error is introduced in the indications. However, if the antennas are a considerable distance from this point, some compensation should be provided. This can be done by distorting the wave form of the range sweep voltage as applied to the mixer 29. The amount of distortion must vary with the elevation of the beam of the antenna 7, and is of such form as to make the range sweep wave somewhat concave downward. Means for providing such distortion are not a part of the present invention and accordingly are not claimed herein.

I claim as my invention:

1. An instrument ground approach system for aircraft, including at a ground station, radar distance and course determining means scanning alternately in azimuth and in elevation throughout respective sectors which include the glide path to be followed in landing, said radar means providing substantially continuously information as to the range, azimuth, and elevation of an aircraft within said sectors; a cathode ray tube including a luminescent screen, means controlling the cathode ray of said tube in response to said radar means during said scanning in azimuth to produce on said screen a spot whose position with respect to the undeflected position of said ray corresponds to the position of said aircraft in range and azimuth with respect to said ground station, and means controlling said cathode ray during said scanning in elevation to produce on said screen a line whose perpendicular distance from said undeflected spot position corresponds to said range plus a quantity proportional to the deviation of the elevation angle of said aircraft from the elevation angle of said glide path, said last-named means comprising an oscillator connected to said tube to deflect said cathode ray repeatedly in a direction normal to the range deflection of said spot thereby producing said line, whereby said line runs through the position of said spot only when said craft is at the elevation angle of said glide path.

2. An instrument ground approach system for aircraft, including at a ground station, radar distance and course determining means scanning in azimuth and in elevation throughout respective sectors which include the glide path to be followed by an aircraft in landing, a cathode ray tube including a luminescent screen, means controlling the cathode ray of said tube in response to said radar means during said scanning in azimuth to produce on said screen a spot whose position with respect to the undeflected position of said ray corresponds to the position of an aircraft within said sectors in range and azimuth with respect to said ground station, and means controlling said cathode ray during said scanning in elevation to produce on said screen a line whose perpendicular distance from said undeflected spot position corresponds to said range plus a quantity proportional to the deviation of the elevation angle of said aircraft from the elevation angle of said glide path, including an oscillator connected to said tube to deflect said cathode ray repeatedly back and forth in a direction normal to the range direction of deflection, whereby said line runs through the position of said spot only when said craft is at the elevation angle of said glide path.

3. An instrument ground approach system for aircraft, including at a ground station, means providing substantially continuously information as to the range, azimuth, and elevation of an aircraft with respect to said ground station, a cathode ray tube including a luminescent screen, means alternately controlling the cathode ray of said tube in response to said azimuth and range information to produce on said screen a spot whose position with respect to the undeflected position of said ray corresponds to the position of said aircraft in range and azimuth with respect to said ground station, and means controlling said cathode ray during the periods between the controlling of said spot in response to said range and azimuth information to produce on said screen a line whose perpendicular distance from said undeflected spot position corresponds to said range plus a quantity proportional to the deviation of the elevation angle of said aircraft from the elevation angle of said glide path, said last-named means including an oscillator connected to said tube to deflect said cathode ray in a direction normal to the range direction of deflection of said spot, whereby said line runs through the position of said spot only when said craft is at the elevation angle of said glide path.

4. An instrument ground approach system for aircraft including at a ground station radar distance and course determining means scanning separately in azimuth and in elevation through respective sectors which include the path to be followed by an aircraft in landing, said radar means transmitting pulse modulated signals and receiving, from an aircraft within said sectors, signals in response to such of those transmitted signals as strike said aircraft; a cathode ray tube including a luminescent screen, and means controlling the intensity of the cathode ray of said tube to produce a visible mark on said screen in response to said signals from said aircraft; means deflecting said cathode ray beam radially from a reference position on said screen in a direction which varies corresponding to said azimuth scan and at a rate corresponding to said pulse modulation, to produce a visible spot on said screen spaced from said reference position to indicate the azimuth and range of said craft from said ground station; means deflecting said cathode ray beam along a predetermined line across said screen at a rate corresponding to said pulse modulation and from a starting point which varies in position along said line according to said elevation scanning; an oscillator, and means applying the output of said oscillator to said cathode ray tube only in response to reception of said signals from said aircraft during said elevation scanning to deflect said cathode ray beam transversely with respect to said predetermined line, to produce a visible line on said screen which goes through said spot only when said craft is on the elevation of said glide path.

HAROLD JOHN SCHRADER.

REFERENCES CITED

The following references are of record in the file of this patent:

UNITED STATES PATENTS

| Number | Name | Date |
|---|---|---|
| 2,405,231 | Newhouse | Aug. 6, 1946 |
| 2,423,104 | Labin | July 1, 1947 |
| 2,423,829 | Ferrell | July 15, 1947 |
| 2,436,655 | Locke | Feb. 24, 1948 |
| 2,459,481 | Wolfe | Jan. 18, 1949 |
| 2,459,482 | Bond | Jan. 18, 1949 |